US 8,469,212 B2

(12) United States Patent
Goto et al.

(10) Patent No.: US 8,469,212 B2
(45) Date of Patent: Jun. 25, 2013

(54) SAFETY CAP AND CONTAINER WITH SAFETY CAP

(75) Inventors: Takayuki Goto, Tokyo (JP); Shigeo Iizuka, Tokyo (JP); Hiroshi Mizushima, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 59 days.

(21) Appl. No.: 12/923,606

(22) Filed: Sep. 29, 2010

(65) Prior Publication Data

US 2011/0062107 A1 Mar. 17, 2011

Related U.S. Application Data (63) Continuation of application No. 10/496,964, filed as application No. PCT/JP02/08831 on Aug. 30, 2002, now abandoned.

(30) Foreign Application Priority Data

Aug. 30, 2001 (JP) .................................. 2001-261788
Aug. 31, 2001 (JP) .................................. 2001-264559

(51) Int. Cl.
*B65D 43/16* (2006.01)

(52) U.S. Cl.
USPC ........... 215/237; 215/245; 215/216; 215/221; 220/254.3; 220/326; 222/556

(58) Field of Classification Search
USPC 215/221, 237, 216, 235; 222/556; 220/254.3, 220/254.5, 326
See application file for complete search history.

(56) References Cited

U.S. PATENT DOCUMENTS

| 4,170,315 | A | | 10/1979 | Dubach et al. |
| 4,629,081 | A | * | 12/1986 | McLaren ..................... 215/206 |
| 4,752,014 | A | | 6/1988 | House et al. |
| 5,449,077 | A | | 9/1995 | Seidler |
| 5,573,127 | A | | 11/1996 | Takahashi et al. |
| 6,170,710 | B1 | | 1/2001 | Suffa |
| 6,866,164 | B2 | | 3/2005 | Branson et al. |

FOREIGN PATENT DOCUMENTS

| DE | 3625477 A1 | 2/1988 |
| JP | Y2-56-28939 | 7/1981 |
| JP | A-09-086550 | 3/1997 |
| JP | A-10-264953 | 10/1998 |
| JP | 11-070955 | 3/1999 |
| JP | A-2000-335610 | 12/2000 |
| JP | A-2000-335611 | 12/2000 |

* cited by examiner

*Primary Examiner* — Anthony Stashick
*Assistant Examiner* — James N Smalley
(74) *Attorney, Agent, or Firm* — Oliff & Berridge, PLC (57) ABSTRACT

There is provided a safety cap which requires manual dexterity for a cover opening operation and is difficult for an infant or the like to open a cover, in which a safety function can be released, as necessary. In the safety cap configured such that a part of an outer circumferential wall of a cap main body is formed on an inward elastically deformable operating plate, a pair of engaging means and engageable with each other are provided on a peripheral wall of a cover connected to the upper portion of the cap main body via a hinge and at the upper portion of the operating plate, respectively, and the engagement is released by elastically deforming the operating plate inward so as to open the cover, the operating plate can be fixed to the cap main body or a neck portion of the container except for the operating plate by the fixing member in the inward deformed state.

7 Claims, 12 Drawing Sheets

SAFETY CAP AND CONTAINER WITH SAFETY CAP

This is a Continuation of application Ser. No. 10/496,964 filed Feb. 7, 2005, which in turn is a National Stage of PCT/JP02/08831 filed Aug. 30, 2002, which claims the benefit of Japanese Patent Application Nos. 2001-261788 filed Aug. 30, 2001, and 2001-264559 filed Aug. 31, 2001. The disclosures of the prior applications are hereby incorporated by reference herein in their entirety.

BACKGROUND

The present invention relates to a safety cap, in particular, a cap with a cover which cannot be opened without performing any predetermined cover opening operation, and a container with the cap.

There has been conventionally proposed a cap comprising a cylindrical main body to be fitted to the outer surface of a top opened neck portion and a cover for covering the upper surface of the main body as a cap for a container for containing therein various kinds of contents in addition to drink. Such a cap has an advantage that anyone can easily open the cap, but to the contrary, an infant or the like mischievously opens the cap, thereby resulting in a possibility that the contents spill around or is unjustly drained out.

In order to eliminate the above-described inconvenience, there has been proposed a safety cap requiring a difficult cover opening operation for others than an adult having some degree of manual dexterity: for example, (1) A safety cap having an inner cap screwed at an outer surface of a neck portion of a container and an outer cap covering the outer surface of the inner cap in a not-pullable and rotatable manner, wherein the outer cap is idly rotated with respect to the inner cap so as to prevent the outer cap from being screwed out at all times even if the outer cap is rotated in an opening direction, the cap comprising a ball type torque transmission mechanism which is interposed between the inner and outer caps and is operated only when the outer cap is rotated in a closing direction and when the outer cap is rotated in the opening direction and the container is tilted in a certain direction (see Japanese Utility Model Application Publication No. 56-28939);

(2) A safety cap comprising an engaging pin, which penetrates through respective top plates of inner and outer caps, disposed in a detachable manner in place of the ball type torque transmission mechanism in the safety cap disclosed in the above item (1) (see Japanese Patent Application Laid-open No. 2000-335610);

(3) A safety cap comprising engaging means, which engage with each other when an outer cylinder is rotated in a closing direction while disengage from each other when the outer cylinder is rotated in an opening direction, formed between a rotating cylinder fitted to the outer surface of a neck portion of a container in a not-pullable manner and the outer cylinder having a top, screwed at the outer surface of the rotating cylinder except for a lower end, wherein the outer cylinder is disposed in such a manner as to be idly rotated with respect to the rotating cylinder in a disengaging state and the outer cylinder can be de-screwed from the rotating cylinder since the engagement is released when a part of the lower end of the rotating cylinder is pressed (see Japanese Patent Application Laid-open No. 2000-335611);

(4) A safety cap in which a cover is connected, via a hinge, to a rear portion of a cap main body having an pouring hole formed at a top plate, an operating plate suspended down from a cover front portion is inserted into a fixing tool formed into a U shape, as viewed from above, attached to the front surface of the main body, and the upper half of the operating plate separatably engages with the fixing tool by pressing the upper half of the operating plate rearward against the lower half of the operating plate (see Japanese Patent Application Laid-open No. 9-86550); and (5) A safety cap in which locking pieces are formed on right and left side walls of a circumferential wall of a cap main body having a cover connected to the rear portion thereof via a hinge by boring a split groove in substantially an inverted U shape except for the lower end thereof, and the upper end of the locking piece separatably engages with the cover circumferential wall by pressing the locking piece inward (see Japanese Patent Application Laid-open No. 10-264953 and Japanese Patent No. 3,273,359).

SUMMARY

The structures of the safety caps disclosed in the above items (1) to (3) have a restriction of application only to a type screwed to the neck portion of the container. For example, a type having the cover connected to the cap main body via the hinge is used as a cap for a squeeze type container containing detergent and the like therein in such a manner as to facilitate an opening/closing operation. As the safety cap applicable to such a type has been proposed the safety cap disclosed in the above item (4), in which since the lower portion of the operating plate is exposed to the outside as a depressing button in the configuration of the cap, there may occur a disadvantage depending on the use of the cap for the reason of degradation of the outside appearance of the cap or adhesion of dust to the lower portion of the operating plate. In order to eliminate such a disadvantage, in the cap disclosed in the above item (5), the locking piece for maintaining a cover closed state is formed as a part of the cover peripheral wall (specifically, the right and left sides). In the case of this cap, the locking piece must be pushed inward of the cap, and at the same time, the cover front portion must be rotated in the opening direction, and therefore, the cover opening operation becomes slightly complicated in comparison with the cap disclosed in the above item (4) in which the cover is released simply by pressing up the lower portion of the operating plate at the time of the inward pressing. Although this is advantageous in view of prevention of any unexpected release caused by a mischief by a baby or an infant, the cover must be opened every time in the case where an adult repeatedly uses the container in a situation in which there is no such fear as unexpected release, and therefore, a user cannot stand the repetitive operations with inconvenience.

A first object of the present invention is to provide a container with ease of use for an adult while keeping the function of preventing unexpected or unjust use of a safety cap by an infant or the like.

In order to achieve the above-described object, according to the present invention, in a safety cap for disposing a container including:

a cap main body having a top plate with an pouring hole, and an outer circumferential wall and an inner circumferential wall for attachment to a container neck portion, said outer and inner circumferential walls extending downwardly from the top plate, and a part of the outer circumferential wall being formed in an inward elastically deformable operating plate, at a peripheral edge of which a separation line is cut except its lower end or vicinity thereof remaining as a connection portion;

a cover connected to the upper portion of the cap main body via a hinge such that the cover is capable of putting thereon and removing therefrom;

wherein a pair of engaging means and engageable with each other are disposed at a peripheral wall of the cover and the operating plate, respectively, and further, the cover can be opened by releasing the engagement between the engaging means by deforming the operating plate inward, wherein the operating plate can be fixed to the container neck portion or the cap main body except for the operating plate by a fixing means for fixing the operating plate in an inward deformed state.

Here, it is preferable that the lower end of the operating plate should be formed into the connection portion serving as a fixing end, around which the operating plate can be disposed in a freely inward swingable manner as a whole while.

Furthermore, it is preferable that the fixing member should be constituted of an engaging piece disposed at the operating plate, and an engaging piece receiver disposed at the cap main body except for the operating plate.

A second object of the present invention is to provide a convenient safety cap capable of releasing engagement of the engaging means and fixing an operating plate by a single operation of pushing the operating plate inward.

In order to achieve the above-described object, according to the present invention, in the safety cap according to the above-described first invention, there is proposed that the engaging piece serves as an upper end of the operating plate, and further, the engaging piece receiver is a projection formed at an undersurface of the top plate outward of the inner circumferential wall.

A third object of the present invention is to provide a safety cap in which the operating plate is fixed by two operations. Consequently, the operating plate is fixed only when a user intends to fix the operating plate.

In order to achieve the above-described object, according to the present invention, in the safety cap according to the above-described first object, there is provided the safety cap in which the engaging piece serves as an upper end of the operating plate, and further, the engaging piece receiver is disposed in an elastically bending plate formed at an end of the top plate near the operating plate in such a manner as to engage with the engaging piece when the elastically bending plate is bent downward.

A fourth object of the present invention is to fix the operating plate to the cap main body by an easy operation, and further, to achieve good appearance in the fixed state.

In order to achieve the above-described object, according to the present invention, in the safety cap according to the above-described first object, there is proposed that the engaging piece serves as a tenon protruding inward from the upper end of the operating plate and being wider at its intermediate portion than a base end and tip end thereof, and further, the engaging piece receiver serves as a tenon groove having a shape in conformity with the tenon, cut out at an end of the top plate near the operating plate.

A fifth object of the present invention is to conceal the fixing means from a user by fixing the operating plate inside of the cap main body, and further, to facilitate operations for fixing and detaching the operating plate to and from the cap main body.

In order to achieve the above-described object, according to the present invention, in the safety cap according to the above-described first object, there is provided the safety cap in which the fixing member is formed of an engaging projection, which is longitudinally disposed at either one of an inner surface of the operating plate and an opposite outer surface of the inner circumferential wall, and an engaging groove, which is disposed at the other and can engage with the engaging projection.

A sixth object of the present invention is to provide a container with a safety cap by constituting an operating plate in a manner freely fixed inward of the cap main body by operation for rotating the safety cap about the axis of the neck portion of the container, so as to achieve easy and secure fixture.

In order to achieve the above-described object, according to the present invention, there is proposed a container with a safety cap having the top-opened neck portion extending upwardly and the safety cap disposed at the neck portion according to the above-described first object, the safety cap comprising a pair of the connecting portions (13) and the fixing member (14), the pair of connecting portions (13) being disposed at both side edges of the operating plate (6) near the lower end of the operating plate with a distance from the lower end thereof, the fixing member (14) being a first and a second projections (54),(18), the second projection (18) being attached to the inner surface of the operating plate under the connecting portion, the first projection (54) being formed at a base outer surface of the neck portion with a distance from the second projection in a circumferential direction;

wherein the second projection rides on the first projection when the cap main body (2) is rotated about the neck portion (52), so that the operating plate (6) is displaced inward against elasticity, so as to release the engagement between the engaging means (7) and (22).

Other objects of the present invention will be obvious from explanation of best mode for carrying out the invention, described later.

DETAILED DESCRIPTION OF EMBODIMENTS

FIGS. 1 to 4 show a first embodiment according to the present invention. In the present specification, the concepts "back and forth" and "right and left" are used, as required, in order to express the mutually positional relationships between members.

Reference numeral 1 designates a safety cap, which is constituted of a cap main body 2 and a cover 20.

In the cap main body 2, the upper end of an outer circumferential wall 11 is formed into a small-diameter portion 11a via an upward step 11b, and then, the upper surface of the small-diameter portion is closed by a top plate 3. Moreover, an inner circumferential wall 10 fittable to the outer surface of a neck portion 52 of a container 51 is suspended down from the undersurface of the top plate, and further, a part of the top plate inward of the inner circumferential wall is raised in a semispherical shape, so that a pouring hole 4 is formed at the top of the raised portion. Otherwise, a seal cylinder to be fitted to the inner surface of the neck portion 52 may be suspended down from the surroundings of the pouring hole.

On the outer circumferential wall 11 is disposed at least one operating plate 6 (or a pushbutton). Preferably, a pair of operating plates should be disposed on both sides on the outer circumferential wall 11 in the cap main body with substantially equal intervals from a hinge, described later, as shown in FIGS. 1 to 4. The operating plate 6 is defined by a generally inverted U-shaped split groove 5 (or a separating line), so that the operating plate is formed in an inward elastically deformable manner while its lower end being fixed. The split groove 5 is extending vertically from the small-diameter portion 11a on the outer circumferential wall to a vertically intermediate portion of the same. And further, engaging means 7 is additionally formed at the outer surface at a portion 6a at which the small-diameter portion is formed. The lower end of the operating plate 6 as a connecting portion 13 is continuous to the lower portion of the outer circumferential wall 11. Alternatively, the engaging means 7 may be an engaging projection oriented in a circumferential direction.

Figure 1:
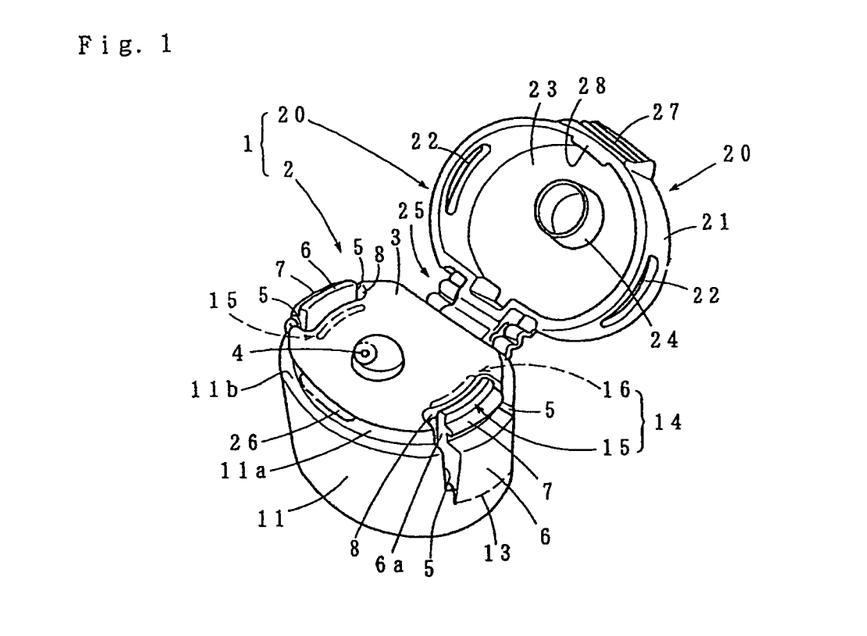
FIG. 1 is a perspective view showing a safety cap in a first embodiment according to the present invention.

In the preferred embodiment, as viewed from the top in FIG. 1, the inverted U-shaped split groove 5 may extends from the right and left ends of the top plate 3 toward an intermediate portion of the outer circumferential wall 11 through the small-diameter portion 11a. In addition, the upper portion of the split groove serves as a cutout 8, which is cut out toward the center of the top plate.

Figure 2:
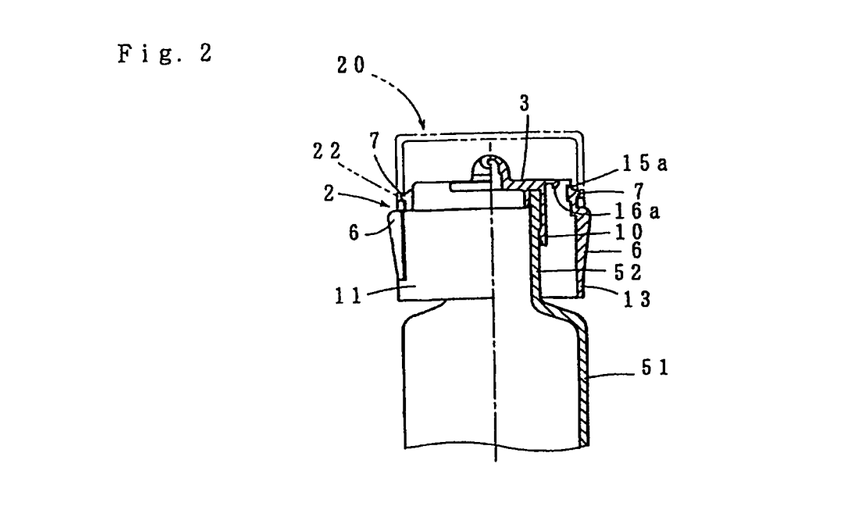
FIG. 2 is a half longitudinal cross-sectional view showing a container having the safety cap shown in FIG. 1 disposed therein, although a cover is omitted.

In the preferred embodiment, the operating plate 6 gradually becomes thicker upward from the lower end, and is disposed in such a manner as to protrude outward from the outline of the outer surface of the outer circumferential wall 11 except for the operating plate 6, as shown in FIGS. 1 and 2. Consequently, the position of the operating plate 6 can be recognized by a touch with a finger without visual perception.

Figure 3:
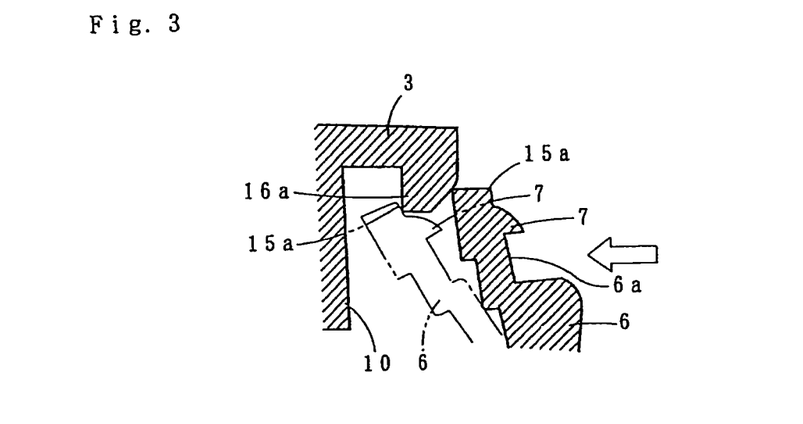
FIG. 3 is a cross-sectional view showing essential parts during an operating plate fixing operation in the safety cap shown in FIG. 1.

In the cap main body 2 is provided with a fixing member 14 for fixing the operating plate, which is constituted of an engaging piece 15 and an engaging piece receiver 16. In the preferred embodiment, the engaging piece serves as an upper end 15a of the operating plate 6, as shown in FIG. 2. Moreover, the cutout 8 is formed in such a manner that the upper end is loosely fitted, and further, a projection 16a serving as the engaging piece receiver is formed at the lower surface of the peripheral edge of the cutout. As shown in FIG. 3, the outer surface of the projection is inclined down inward, so that the operating plate upper end 15a rides over the projection 16a to thus engage with and be locked to the inner surface of the projection When the operating plate 6 is elastically deformed inward.

In the cover 20, engaging slots as engaging means 22 on the side of the cover are formed at both of the right and left of a peripheral wall 21 whose lower portion can detachably engage with the small-diameter portion 11a formed at the cap main body 2. The engaging projections serving as the engaging means 7 on the side of the operating plate are formed in such a manner as to be freely fitted into the engaging slots. Moreover, an engaging cylinder 24 which can detachably engage with the outer surface of the raised portion with the pouring hole 4, described already, is suspended from the center of the lower surface of a cover plate 23 for closing the upper surface of the peripheral wall 21.

Additionally, a mouth on the peripheral Wall 21 is connected to the periphery of the upward step at the cap main end via a hinge 25. It is preferable that the hinge should consist of a thin hinge and tension springs positioned on right and left sides of the hinge. The tension spring functions to hold the cover 20 in an open state shown in FIG. 1.

Here, in FIG. 1, reference numeral 26 designates an elastic locking plate projecting from the outer surface of the front portion of the small-diameter portion 11a on the outer circumferential wall in the cap main body. And reference numeral 27 designates a stopper formed at the outer surface of the front portion on the peripheral wall 21 of the cover. Furthermore, reference numeral 28 designates an engaging portion additionally formed at the inner surface of the lower end of the front portion on the peripheral wall of the cover, wherein the engaging portion 28 can engage with the locking plate 26 by closing the cover.

With the above-described configuration, since the engaging means 7 and 22 engage with each other in the cover closing state indicated by a imaginary line in FIG. 2, the cover 20 cannot be opened in an opening direction, thereby preventing any improper use.

In order to open the cover, the upper portions of the right and left operating plates 6 are pressed inward to be thus elastically deformed, so that the engaging means 7 on the side of the operating plate are separated inward from the engaging means 22 on the side of the cover, and then, the cover 20 is rotated upward. Incidentally, the operating plate is stopped to be pressed at the time of abutment in normally opening the cover since the upper end 15a is formed in such a manner as to freely abut against the outer surface of the projection 16a when the operating plate 6 is pressed inward.

Figure 4:
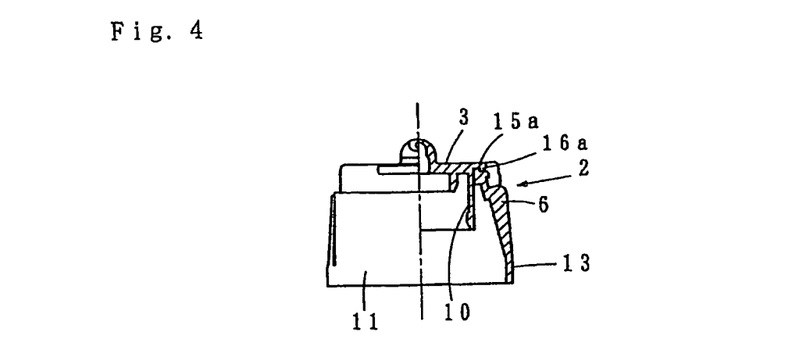
FIG. 4 is a half longitudinal cross-sectional view showing the safety cap shown in FIG. 1 in an operating plate fixing state, although the cover is omitted.

In the case where there is no possibility of improper use, the operation by the operating plate 6 in opening the cover is cumbersome. In order to eliminate such a cumbersome task, the engaging means 7 on the side of the operating plate are separated inward all the time from the engaging means 22 on the side of the cover. For the purpose of such separation, as shown in FIGS. 3 and 4, the operating plate 6 is pressed inward more strongly than when the cover is normally opened, so as to forcibly ride over the projection 16a. In this manner, the upper end 15a of the operating plate is made to engage with the inner surface of the projection. Furthermore, in order to prevent another improper use, the operating plate 6 is separated from the projection 16a. Incidentally, in the present embodiment, it is possible to release the engagement between the engaging means 7 and 22 and allow the operating plate upper end 15a to engage with the projection 16a by the single operation of pushing the operating plate 6 inward, thus achieving excellent ease of use.

Hereinafter, a description will be given below of another embodiment according to the present invention. Here, the same constituents as those in the first embodiment are designated by the same reference numerals, and therefore, the explanation will be omitted.

FIGS. 5 to 9 show a second embodiment according to the present invention.

Figure 6:
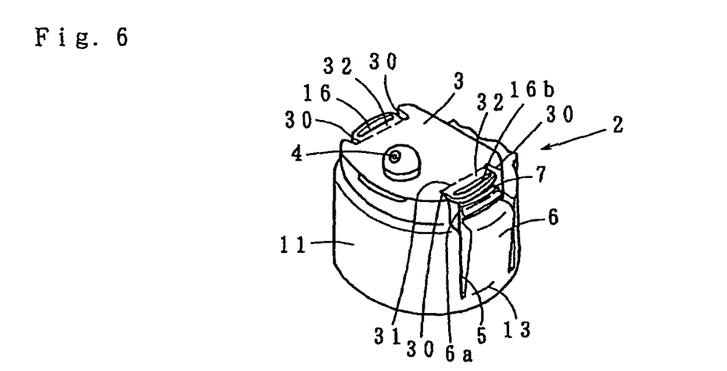
FIG. 6 is a perspective view showing the safety cap shown in FIG. 5, although the cover is omitted.
Figure 8:
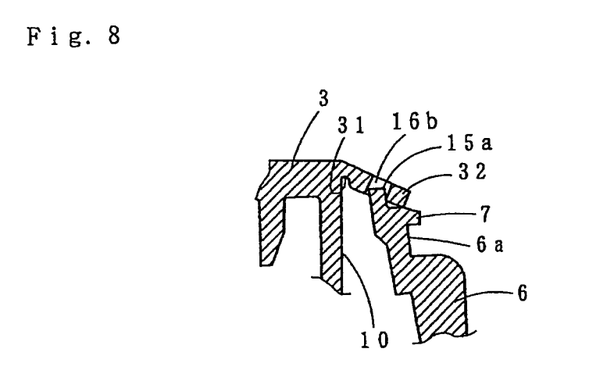
FIG. 8 is a cross-sectional view showing essential parts in the state shown in FIG. 7.

The configuration of an engaging piece receiver 16 in fixing member 14 mainly is varied in the present embodiment. That is to say, as shown in FIG. 6, a pair of narrow cutouts 30 are formed at right and left ends of a top plate 3 in a cap main body in a manner corresponding to vertical groove portions of split grooves 5. Each of base ends at the top plate on both cutouts is formed as a thin bending line 31, the top plate between the cutouts is formed as an elastically bending plate 32, which can be bent downward, as indicated in FIG. 8. Furthermore, a slot 16b serving as an engaging piece receiver is bored at the bending plate. The slot is located at a position at which an engaging piece formed as an upper end 15a of the operating plate can be locked only when the elastically bending plate is bent and an operating plate 6 is elastically deformed inward.

Figure 5:
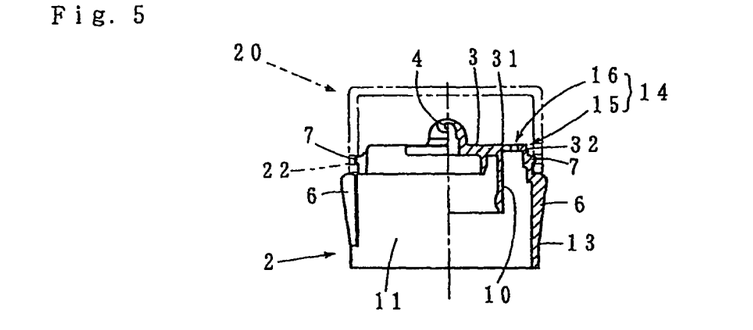
FIG. 5 is a longitudinal cross-sectional view showing a safety cap in a second embodiment according to the present invention, although a cover is omitted.

With the above-described configuration, since engaging means 7 and 22 engage with each other in a cover closing state indicated by a imaginary line in FIG. 5 in the same manner as in the first embodiment, a cover 20 can be prevented from being opened, whereby the operating plate need be pushed inward in a cover opening operation.

Figure 7:
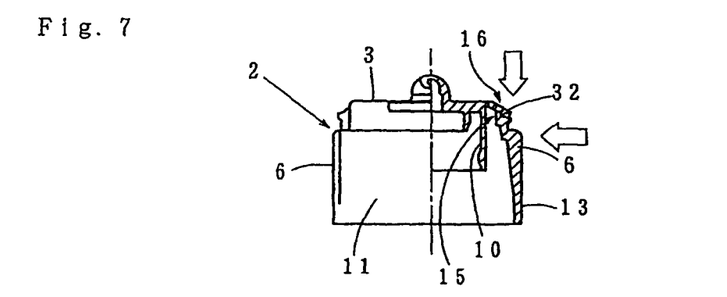
FIG. 7 is a half longitudinal cross-sectional view showing the safety cap shown in FIG. 5 in an operating plate fixing state, although the cover is omitted.
Figure 9:
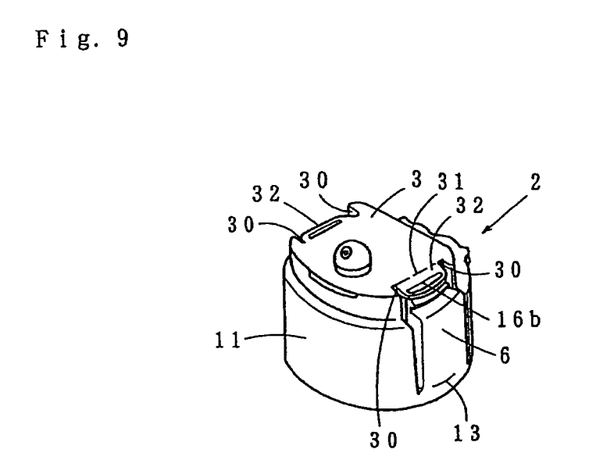
FIG. 9 is a perspective view showing the safety cap in the state shown in FIG. 7, although the cover is omitted.

In the case where there is no possibility of improper use, as shown in FIGS. 7 to 9, the operating plate upper end 15a may be loosely fitted into the slot 16b by bending the elastically bending plate 32 while pushing both of the operating plates 6 inward, so that the engaging means 7 on the side of the operating plate is held in a state separated from the engaging means 22 on the side of the cover. In the present embodiment, two operations, that is, the operation of pushing the operating plate inward and the operation of bending the elastically bending plate 32 are required in order to release the engagement between the engaging means 7 and 22 all the time. As a consequence, it is possible to prevent the engaging means 7 and 22 from being separated at all times, which may occur against a user's will due to carelessness of the user.

Figure 10:
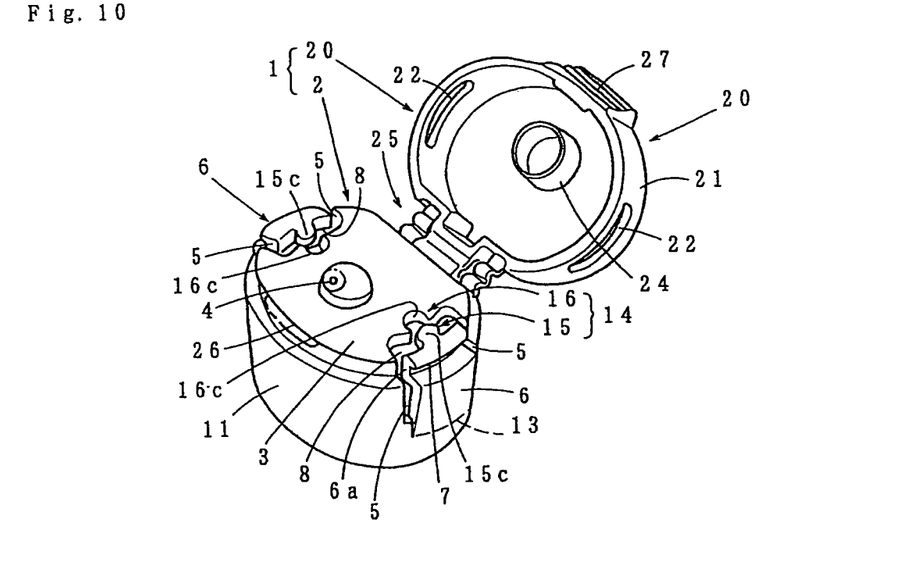
FIG. 10 is a perspective view showing a safety cap in a third embodiment according to the present invention.
Figure 11:
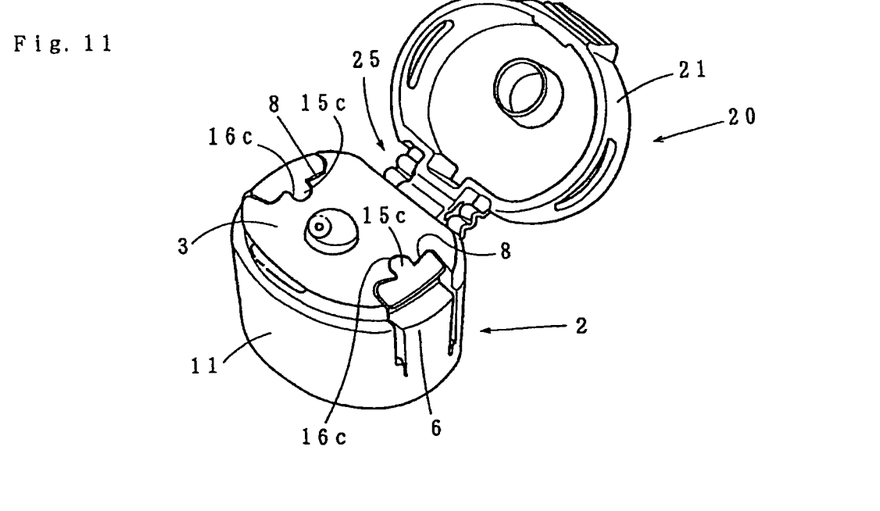
FIG. 11 is a perspective view showing the safety cap shown in FIG. 10 in an operating plate fixing state.

FIGS. 10 and 11 show a third embodiment according to the present invention.

The configurations of an engaging piece 15 and an engaging piece receiver 16 in the first embodiment are varied in the present embodiment. That is to say, cutouts 8, each having a width substantially corresponding to the upper end of an operating plate 6, are formed at right and left ends of a top plate 3, respectively, such that the upper end of the operating plate 6 is loosely fitted into the cutout. A tenon 15c projects inward from the intermediate portion in a width direction at the upper end of the operation plate and is so formed as to be narrower at its (tenon's) intermediate portion than a base end and a tip end. And a tenon groove 16c formed into a shape in conformity with the projection and disposed at a corresponding position of the cutout 8 in the width direction. In the present embodiment, the tenon 15c is formed into a plate-like projection having the outline of a C shape (or an arcuate shape), as viewed from the top. When the tenon is pushed into the tenon groove 16c in a horizontal direction in a state shown in FIG. 10, the intermediate portion of the tenon elastically pushes and enlarges its opening outwardly sideways of the tenon groove, to be thus snapped, as shown in FIG. 11.

With the above-described configuration, since engaging means 7 and 22 engage with each other in a cover closing state in the same manner as in the first embodiment, a cover 20 can be prevented from being opened.

In the case where there is no possibility of improper use, the tenon 15c abuts against the opening of the tenon groove 16c by pushing each of the operating plates 6 inward, and then, is fitted into the tenon groove. Moreover, for the purpose of prevention of another improper use, the tenon is detached outward of the tenon groove. Here, conveniently in the present embodiment, the engagement between the engaging means 7 and 22 can be released and the tenon 15c can be fitted into the tenon groove 16c by a single operation of pushing the operating plate 6 inward, like in the first embodiment. Additionally, the upper end of the operating plate 6 and the top plate 3 in a cap main body are integrally continuous to each other via the tenon and the tenon groove which are formed into complementary shapes, thereby achieving the good outside appearance of the cap in the cover opening state.

Figure 12:
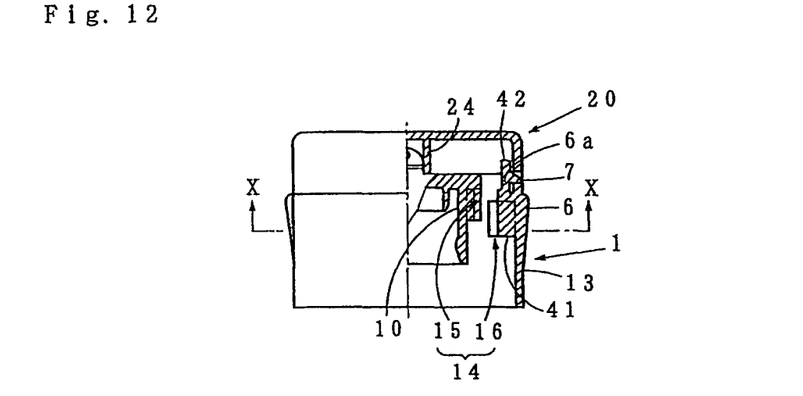
FIG. 12 is a half longitudinal cross-sectional view showing a safety cap in a fourth embodiment according to the present invention.
Figure 13:
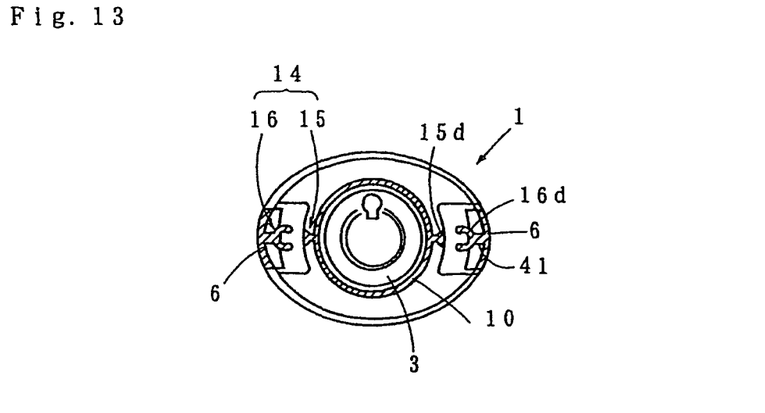
FIG. 13 is a lateral cross-sectional view taken along a line X-X of FIG. 12.
Figure 14:
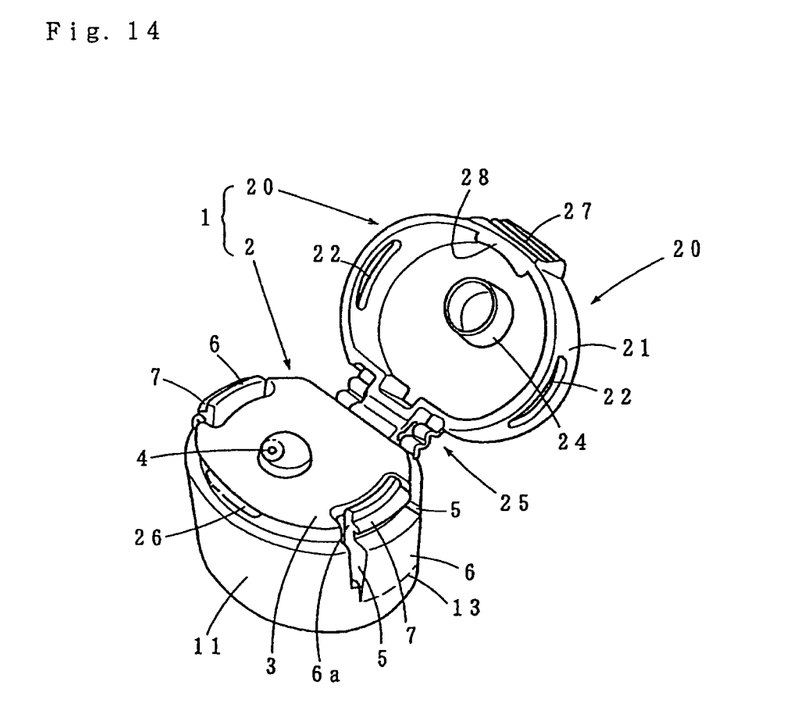
FIG. 14 is a perspective view showing the safety cap shown in FIG. 12.
Figure 15:
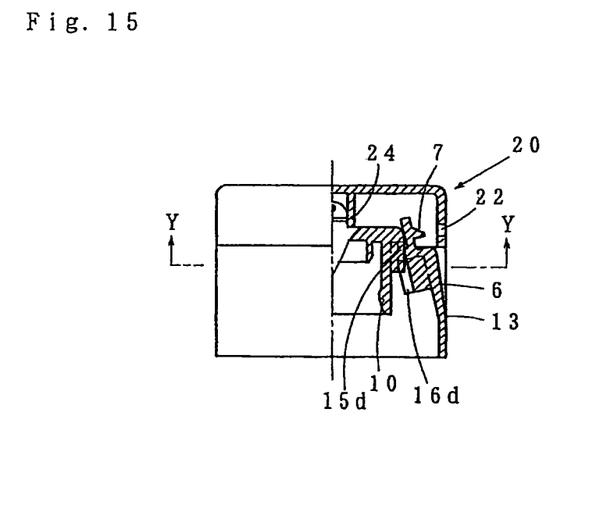
FIG. 15 is a half longitudinal cross-sectional view showing the safety cap shown in FIG. 14 in an operating plate fixing state.
Figure 16:
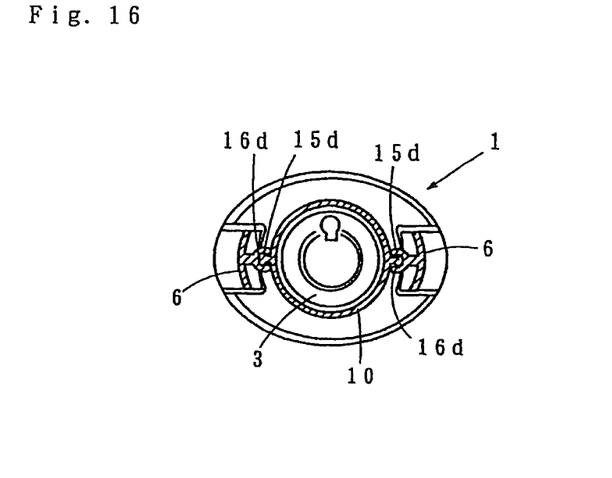
FIG. 16 is a lateral cross-sectional view showing the safety cap, taken along a line-Y-Y of FIG. 15.
Figure 17:
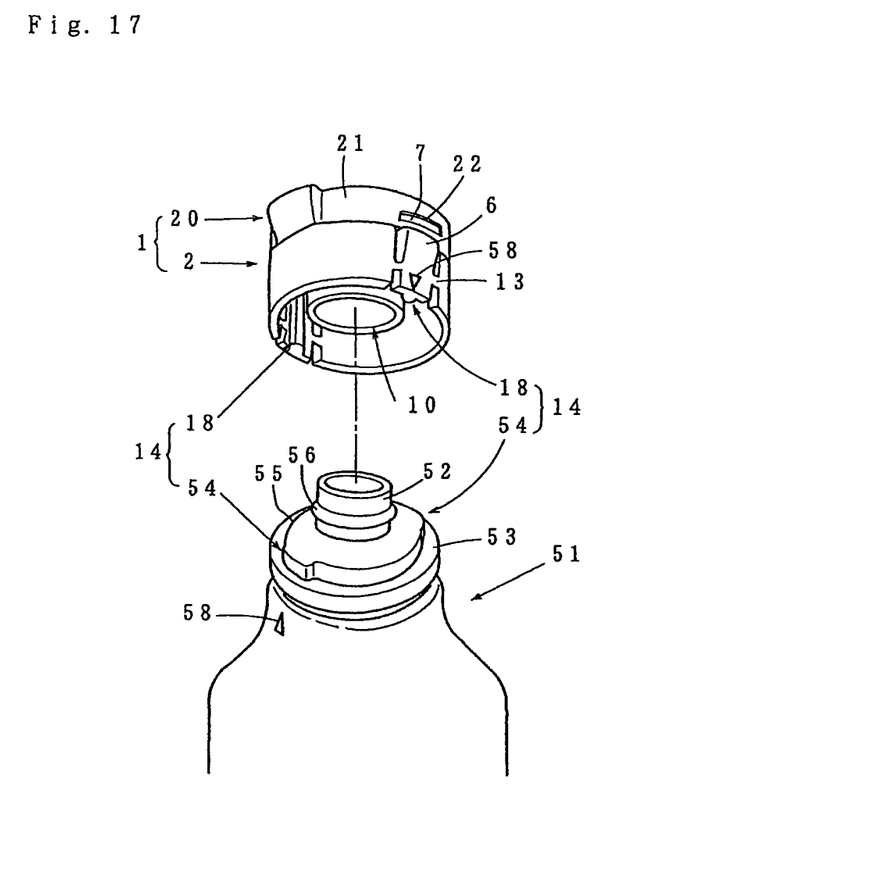
FIG. 17 is an exploded perspective view showing a container with a safety cap in a fifth embodiment according to the present invention.

FIGS. 12 to 16 show a fourth embodiment according to the present invention. In the present embodiment, an engaging piece 15 and an engaging piece receiver 16 are formed inward of an outer circumferential wall 11 of a cap main body 2. The engaging piece 15 and the engaging piece receiver 16 are formed at the inner surface of an operating plate 6 and the outer surface of an inner circumferential wall 10 facing the inner surface, respectively. In the preferred embodiment, as shown in FIG. 13, an engaging projection 15d formed into a T-shape in cross section and longitudinally disposed at the outer surface of the inner circumferential wall 10 serves as the engaging piece, and further, an elastically deformable longitudinal rib 41 formed into a Y-shape in cross section is disposed at the inner surface of the operating plate, so that an engaging groove 16d additionally formed at the tip end of the longitudinal rib serves as the engaging piece receiver. However, the engaging projection 15d may be formed on the operating plate 6 while the engaging groove 16d may be formed on the inner circumferential wall 10, and otherwise, the engaging groove 16d may be formed directly at the outer surface of the inner circumferential wall 10 or the inner surface of the operating plate 6. In the present embodiment, the upper end of the operating plate 6 serving as a finger hook 42 projects upward of the top plate in the cap main body.

With the above-described configuration, in the case where there is no possibility of improper use, the engaging projection 15d abuts against the opening of the engaging groove 16d by pushing the operating plate 6 inward, and then, the engaging projection 15d is fitted into the engaging groove 16d by further pushing the operating plate 6. Moreover, for the purpose of prevention of another improper use, a finger is hooked on the finger hook 42, thereby pushing outward and re-rotating the operating plate.

In the present embodiment, since the engaging piece 15 and the engaging piece receiver 16 are disposed inside of the outer circumferential wall 11 of the cap main body, it is possible to prevent the engagement with the engaging piece receiver from being released due to abutment of other members against the engaging piece. In addition, it is convenient because the engagement can be released only by operating the finger hook 42.

FIGS. 17 to 22 show a fifth embodiment according to the present invention. The present embodiment is configured such that an operating plate 6 is fixed to a container 51.

As shown in FIGS. 17 to 22, in a cap main body 2, a pair of connecting portions 13 for connecting the operating plate to the cap main body except for the operating plate are disposed at both edges of the operating plate near the lower end of the operating plate 6 with a predetermined distance from the lower end, and further, a second projection 18 is additionally formed at the inner surface and the like of the operating plate under the connecting portion. When the second projection is pushed outwardly sideways, the operating plate 6 is rotated about a horizontally rotational axis connecting the connecting portions to each other against the elasticity of the connecting portion, and thus, the operating plate located above the connecting portion is displaced inward.

In the container 51, a first projection 54 is additionally formed at a base outer surface of a top opened neck portion 52 with a space in a circumferential direction at substantially the same position as the second projection 18. A distance from the center axis of the neck portion to the outer surface of the first projection 54 is longer than that from the center axis of the cap main body 2 to the inner surface of the second projection 18. As indicated by an arrow in FIG. 18, when a safety cap 1 is rotated about the neck portion 52, the second projection 18 can ride on the tip end of the first projection 54. In the present embodiment, the first projection 54 and the second projection 18 constitute fixing member 14.

Figure 20:
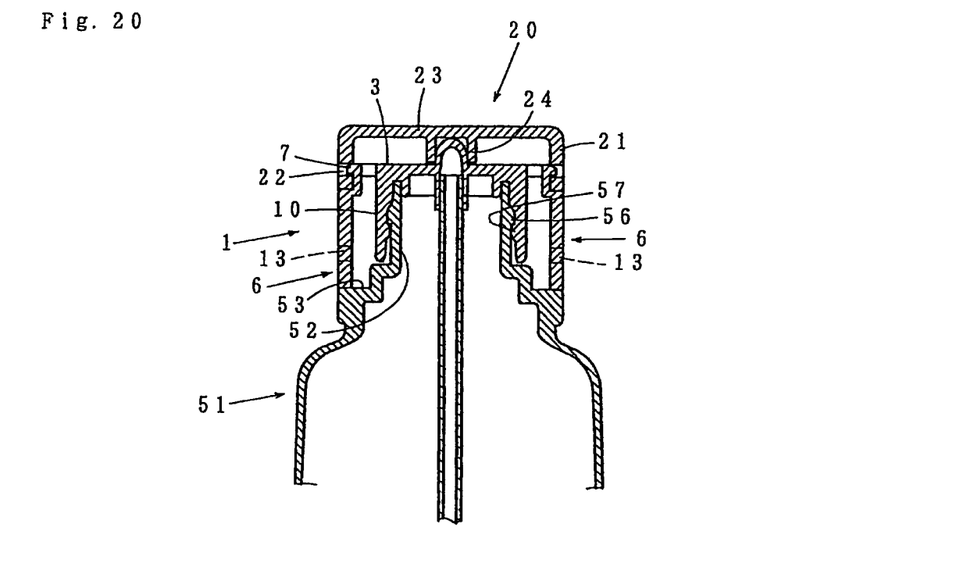
FIG. 20 is a longitudinal cross-sectional view showing the container shown in FIG. 17.
Figure 21:
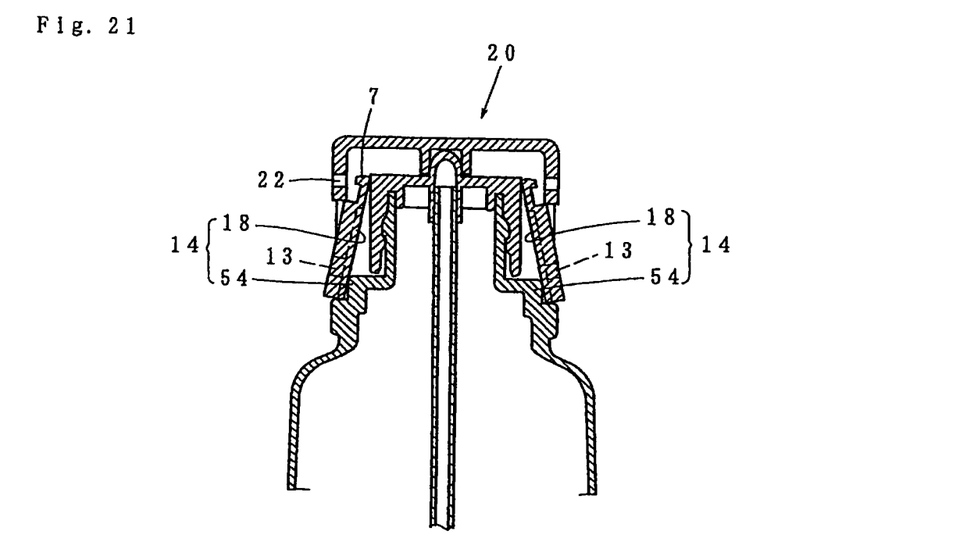
FIG. 21 is a longitudinal cross-sectional view showing a state corresponding to the state shown in FIG. 19.

Particularly in the present embodiment, as shown in FIG. 20, the neck portion 52 is standing upwardly from the inner circumference of an inward flange 53 attached to the upper end of a body, and further, the pair of first projections 54 and 54 are additionally formed at the back and forth portions of the inward flange (that is, at positions deviated at 90? from the operating plates), respectively. Incidentally, the first projections may be formed at the back and forth portions of a raised portion 55 by raising the periphery of the inward flange. It is desirable that the inward flange 53 should be disposed in such a manner as to abut against or approach the lower end of an outer circumferential wall 11 when the cap main body is attached to the neck portion 52.

As shown in FIG. 20, a first engaging projection 56 is circumferentially disposed at the outer surface of the neck portion 52, and further, a second engaging projection 57 is circumferentially disposed at the inner surface of the inner circumferential wall, thereby allowing the second engaging projection 57 to engage with the lower surface of the first engaging projection 56 in the engaging state of the inner circumferential wall with the outer surface of the neck portion, so as to prevent any withdrawal of the cap. Otherwise, marks 58 and 58 may be formed under the first projections 54 and 54, respectively, or rotating range regulating means for the cap with respect to the container may be disposed, so that the second projection rides over the outer surface of the first projection when the cap is rotated up to one end of the regulating means.

Figure 18:
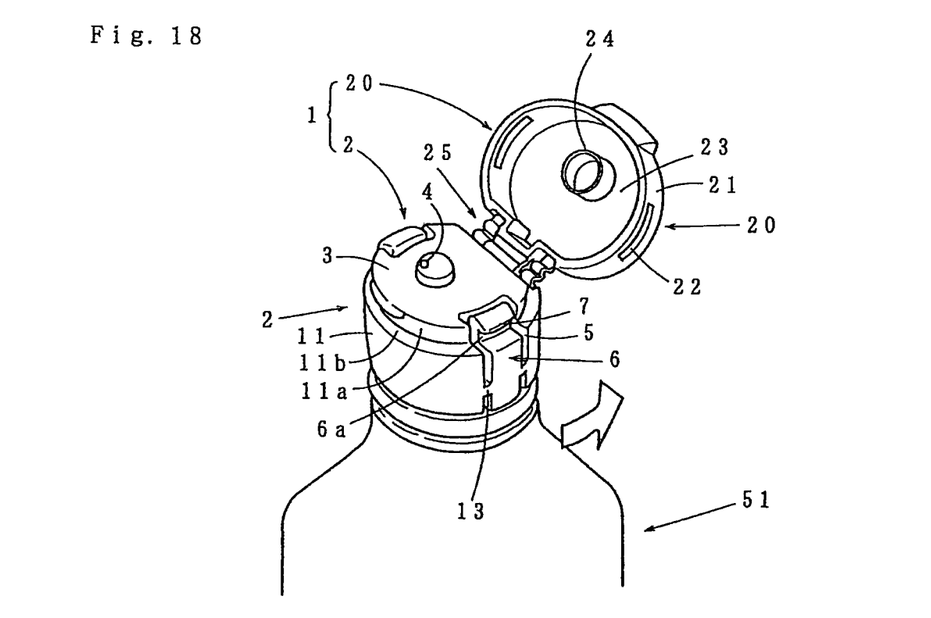
FIG. 18 is a perspective view showing the container shown in FIG. 17 in a cap opening state.
Figure 19:
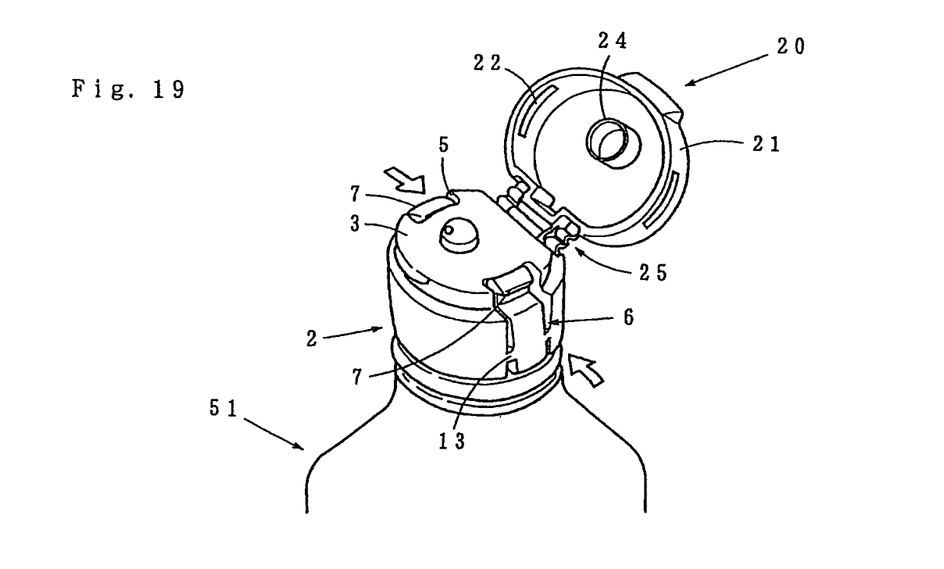
FIG. 19 is a perspective view showing an operating plate in an inward pushed state from the state shown in FIG. 18.

With the above-described configuration, as shown in FIGS. 18 and 20, since engaging means 7 and 22 can engage with each other in the state in which the first and second projections 54 and 18 are located at different positions in the circumferential direction, a cover 20 cannot be opened.

Unless such a safety device as described above is required, the lower portion of the operating plate 6 is pushed outward against the elasticity of the connecting portion 13 and the upper portion of the operating plate is pushed inward to be thus kept, in a state disengaged from the engaging means by allowing the second projection 18 to ride over the outer surface of the first projection 54 by rotating the cap, thereby opening the cover 20 without performing the above-described operation.

In the present embodiment, since the cap main body need be rotated with respect to the neck portion of the container in order to secure the operating plate at an inward displaced position, a user cannot release the above-described safety device by erroneous operation. Furthermore, since the fixing member 14 is disposed inward of the outer circumferential wall 11 of the cap main body, the fixed state cannot be released by abutment of other members against the fixing means.

Figure 22:
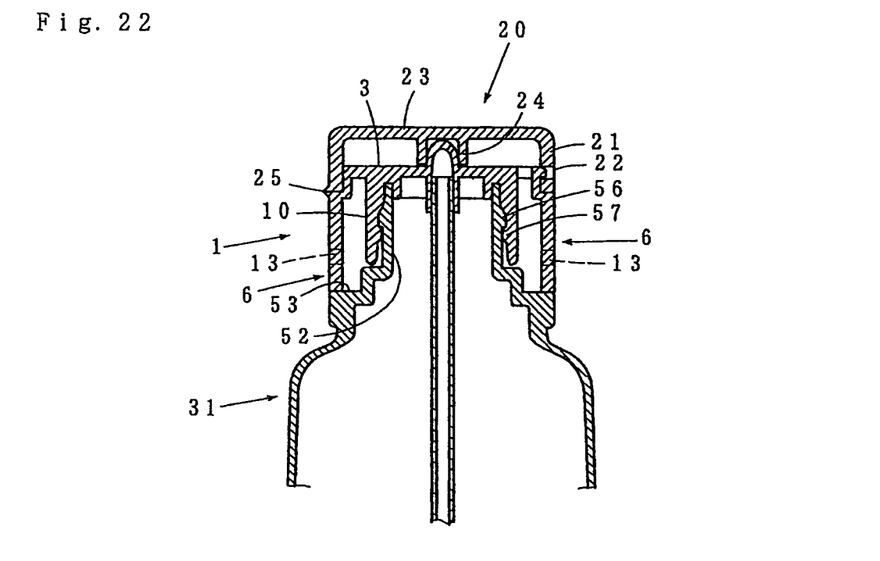
FIG. 22 is a longitudinal cross-sectional view showing a modification of the container in the fifth embodiment.
Figure 23:
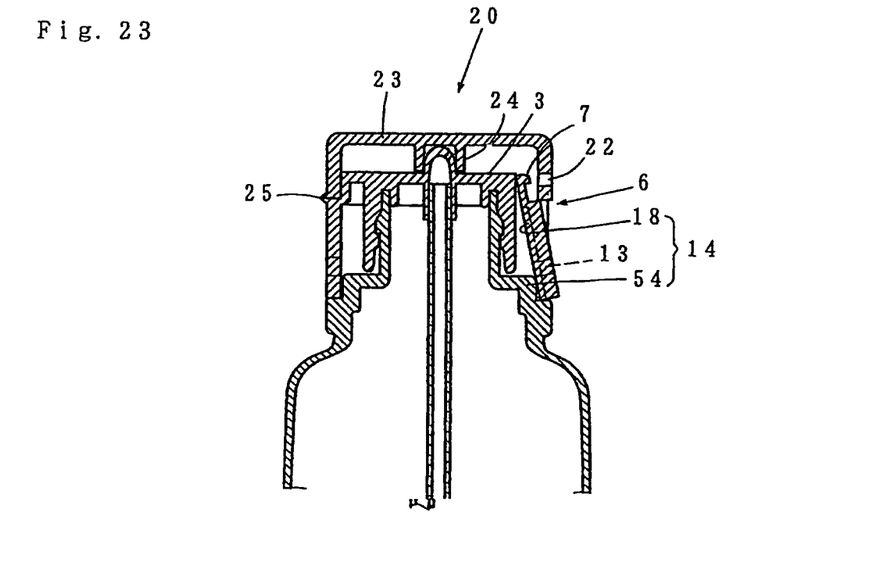
FIG. 23 is a perspective view showing the container shown in FIG. 22 in an operating plate inward pushed state.

FIGS. 22 and 23 show a modification of the present embodiments, wherein a single operating plate 6 is disposed on an outer circumferential wall 11 of a cap main body on an opposite side in a diametrical direction with respect to a hinge 25.

What is claimed is:

1. A safety cap for disposing a container comprising:
   a cap main body having a top plate with a pouring hole, and an outer circumferential wall and an inner circumferential wall for attachment to a container neck portion,
      said outer and inner circumferential walls being suspended from the top plate, and a part of the outer circumferential wall being formed in an inward elastically deformable operating plate, at a peripheral edge of which a separation line is cut except for its lower end or vicinity thereof remaining as a connection portion to the outer circumferential wall, the inward elastically deformable operating plate being configured to deformably move between a first position, a second position and a third position;
   a cover connected to an upper portion of the cap main body via a hinge such that the cover is capable of moving toward and away from the cap main body;
   a pair of engaging means is disposed at a peripheral wall of the cover and the inward elastically deformable operating plate, respectively, the pair of engaging means being configured to engage with each other in the first position of the inward elastically deformable operating plate, and the cover being configured to open by releasing the engagement by elastically deforming the inward elastically deformable operating plate inward into the second position; and
   a fixing means configured to fix the inward elastically deformable operating plate to the cap main body or the container neck portion by deforming the inward elastically deformable operating plate inwardly to the third position from the second position,
   wherein
      the inward elastically deformable operating plate: i) having a lower end and an upper end and is gradually thicker beginning at the lower end toward the upper end, ii) is disposed so as to protrude outward from an outer surface of the outer circumferential wall, and iii) is defined by an inverted U-shaped split groove and extends vertically from a small diameter portion on the outer circumferential wall to a vertically intermediate portion of the same, a lower end of the inward elastically deformable operating plate is formed into the connection portion serving as a fixing end, around which the inward elastically deformable operating plate can be disposed in a freely inward swingable manner as a whole, the fixing means includes an engaging piece disposed at the inward elastically deformable operating plate, and an engaging piece receiver disposed at the cap main body except for the inward elastically deformable operating plate, and the engaging piece is disposed on a top end of the inward elastically deformable operating plate, and further, the engaging piece receiver is a protection formed at an undersurface of the top plate outward of the inner circumferential wall.

2. A safety cap according to claim 1, wherein the engaging piece receiver is disposed in an elastically bending plate formed at an end of the top plate near the inward elastically deformable operating plate in such a manner as to engage with the engaging piece when the elastically bending plate is bent downward.

3. A safety cap according to claim 1, wherein the engaging piece serves as a tenon protruding inward from an upper end of the inward elastically deformable operating plate and being wider at its intermediate portion than a base end and a tip end thereof, and further, the engaging piece receiver serves as a tenon groove having a shape in conformity with the tenon, cut out at an end of the top plate near the inward elastically deformable operating plate.

4. A safety cap according to claim 1, wherein the fixing means is formed of an engaging projection, which is longitudinally disposed at either one of an inner surface of the inward elastically deformable operating plate and an opposite outer surface of the inner circumferential wall, and an engaging groove, which is disposed at the other and can engage with the engaging projection.

5. A container with a safety cap having the top-opened neck portion extending upwardly and the safety cap disposed at the neck portion according to claim 1, the safety cap comprising a pair of the connecting portions and the fixing means, the pair of connecting portions being disposed at both side edges of the inward elastically deformable operating plate near the lower end of the inward elastically deformable operating plate with a distance from the lower end thereof, the fixing means being a first and a second projections, the second projection being attached to the inner surface of the inward elastically deformable operating plate under the connecting portion, the first projection being formed at a base outer surface of the neck portion with a distance from the second projection in a circumferential direction; wherein the second projection rides on the first projection when the cap main body is rotated about the neck portion, so that the inward elastically deformable operating plate is displaced inward against elasticity, so as to release the engagement between the engaging means.

6. A safety cap for disposing a container comprising:
a cap main body having a top plate with a pouring hole, and an outer circumferential wall and an inner circumferential wall for attachment to a container neck portion,
said outer and inner circumferential walls being suspended from the top plate, and a part of the outer circumferential wall being formed in an inward elastically deformable operating plate, at a peripheral edge of which a separation line is cut except for its lower end or vicinity thereof remaining as a connection portion to the outer circumferential wall, the inward elastically deformable operating plate being configured to deformably move between a first position, a second position and a third position;

a cover connected to an upper portion of the cap main body via a hinge such that the cover is capable of moving toward and away from the cap main body;

a pair of engaging means is disposed at a peripheral wall of the cover and the inward elastically deformable operating plate, respectively, the pair of engaging means being configured to engage with each other in the first position of the inward elastically deformable operating plate, and the cover being configured to open by releasing the engagement by elastically deforming the inward elastically deformable operating plate inward into the second position; and a fixing means configured to fix the inward elastically deformable operating plate to the cap main body or the container neck portion by deforming the inward elastically deformable operating plate inwardly to the third position from the second position, wherein the inward elastically deformable operating plate: i) having a lower end and an upper end and is gradually thicker beginning at the lower end toward the upper end, ii) is disposed so as to protrude outward from an outer surface of the outer circumferential wall, and iii) is defined by an inverted U-shaped split groove and extends vertically from a small diameter portion on the outer circumferential wall to a vertically intermediate portion of the same, a lower end of the inward elastically deformable operating plate is formed into the connection portion serving as a fixing end, around which the inward elastically deformable operating plate can be disposed in a freely inward swingable manner as a whole, the fixing means includes an engaging piece disposed at the inward elastically deformable operating plate, and an engaging piece receiver disposed at the cap main body except for the inward elastically deformable operating plate, and the engaging piece is disposed on a top end of the inward elastically deformable operating plate, and further, the engaging piece receiver is disposed in an elastically bending plate formed at an end of the top plate near the inward elastically deformable operating plate in such a manner as to engage with the engaging piece when the elastically bending plate is bent downward.

7. A safety cap for disposing a container comprising:
a cap main body having a top plate with a pouring hole, and an outer circumferential wall and an inner circumferential wall for attachment to a container neck portion,
said outer and inner circumferential walls being suspended from the top plate, and a part of the outer circumferential wall being formed in an inward elastically deformable operating plate, at a peripheral edge of which a separation line is cut except for its lower end or vicinity thereof remaining as a connection portion to the outer circumferential wall, the inward elastically deformable operating plate being configured to deformably move between a first position, a second position and a third position;

a cover connected to an upper portion of the cap main body via a hinge such that the cover is capable of moving toward and away from the cap main body;

a pair of engaging means is disposed at a peripheral wall of the cover and the inward elastically deformable operating plate, respectively, the pair of engaging means being configured to engage with each other in the first position of the inward elastically deformable operating plate, and the cover being configured to open by releasing the engagement by elastically deforming the inward elastically deformable operating plate inward into the second position; and a fixing means configured to fix the inward elastically deformable operating plate to the cap main body or the container neck portion by deforming the inward elastically deformable operating plate inwardly to the third position from the second position, wherein the inward elastically deformable operating plate: i) having a lower end and an upper end and is gradually thicker beginning at the lower end toward the upper end, ii) is disposed so as to protrude outward from an outer surface of the outer circumferential wall, and iii) is defined by an inverted U-shaped split groove and extends vertically from a small diameter portion on the outer circumferential wall to a vertically intermediate portion of the same, a lower end of the inward elastically deformable operating plate is formed into the connection portion serving as a fixing end, around which the inward elastically deformable operating plate can be disposed in a freely inward swingable manner as a whole, the fixing means includes an engaging piece disposed at the inward elastically deformable operating plate, and an engaging piece receiver disposed at the cap main body except for the inward elastically deformable operating plate, and the engaging piece serves as a tenon protruding inward from a top end of the inward elastically deformable operating plate and being wider at its intermediate portion than a base end and a tip end thereof, and further, the engaging piece receiver serves as a tenon groove having a shape in conformity with the tenon, cut out at an end of the top plate near the inward elastically deformable operating plate.

* * * * *